US006946497B2

(12) United States Patent
Yu

(10) Patent No.: US 6,946,497 B2
(45) Date of Patent: Sep. 20, 2005

(54) PROCESS FOR MAKING VISCO-ELASTIC FOAM

(75) Inventor: Jianming Yu, Brussels (BE)

(73) Assignee: Huntsman International LLC, Salt Lake City, UT (US)

(*) Notice: Subject to any disclaimer, the term of this patent is extended or adjusted under 35 U.S.C. 154(b) by 119 days.

(21) Appl. No.: 10/694,128

(22) Filed: Oct. 27, 2003

(65) Prior Publication Data

US 2004/0087675 A1 May 6, 2004

Related U.S. Application Data

(63) Continuation of application No. PCT/EP02/03635, filed on Apr. 2, 2002.

(30) Foreign Application Priority Data

Apr. 27, 2001 (EP) .............................. 01110512

(51) Int. Cl.$^7$ .............................. C08G 18/28
(52) U.S. Cl. ............. 521/174; 252/182.25; 252/182.27; 521/130; 521/170
(58) Field of Search ................. 521/130, 170, 521/174; 252/182.25, 182.27

(56) References Cited

U.S. PATENT DOCUMENTS

| 4,559,366 A | 12/1985 | Hostettler |
| 4,839,397 A | 6/1989 | Lohmar et al. |
| 4,950,694 A | 8/1990 | Hager |
| 5,063,253 A | * 11/1991 | Gansen et al. ............. 521/159 |
| 5,594,097 A | 1/1997 | Chaffanjon et al. |
| 5,847,014 A | 12/1998 | Nodelman et al. |
| 6,087,410 A | 7/2000 | Falke et al. |
| 6,391,935 B1 | 5/2002 | Hager et al. |

FOREIGN PATENT DOCUMENTS

| EP | 0 331 941 | 9/1989 |
| EP | 0 386 974 | 9/1990 |
| EP | 0 422 471 | 4/1991 |
| EP | 0 433 878 | 6/1991 |
| EP | 0 459 622 | 12/1991 |
| EP | 0 541 391 | 5/1993 |
| EP | 0 555 721 | 8/1993 |
| EP | 0 913 414 | 5/1999 |
| EP | 0 934 962 | 8/1999 |
| EP | 0 602 059 | 1/2000 |
| JP | 07 324161 | 12/1995 |
| WO | WO 80/02427 | 11/1980 |
| WO | WO 96/06874 | 3/1996 |
| WO | WO 98/16567 | 4/1998 |
| WO | WO 01/32736 | 5/2001 |
| WO | WO 01/57104 | 8/2001 |

OTHER PUBLICATIONS

J.H. Arceneaux et al., Journal of Elastomers and Plastics, p. 63, vol. 14, 1982.

* cited by examiner

Primary Examiner—John M. Cooney, Jr.
(74) Attorney, Agent, or Firm—Nicole Graham

(57) ABSTRACT

Process for preparing a visco-elastic polyurethane foam by reacting a polyisocyanate composition with a polyol composition comprising b1) an EO-rich polyol; b2) a polyol with an EO content between 20–50% and a primary hydroxy content of at least 50%; b3) a polyol with an EO content between 10–20% and a primary hydroxy content of at least 50%; and b4) a polyoxyalkyleneglycol. Further provided is a polyol composition.

28 Claims, No Drawings

PROCESS FOR MAKING VISCO-ELASTIC FOAM

CROSS REFERENCE TO RELATED APPLICATIONS

This application is a continuation of international application PCT/EP02/03635, filed Apr. 2, 2002, and claims priority to EP 01110512.9, filed Apr. 27, 2001.

FIELD OF THE INVENTION

The instant invention relates to a process for making visco-elastic foams. It also relates to reaction systems that are useful in the process, as well as specific polyols blends.

BACKGROUND OF THE INVENTION

Visco-elastic foams are usually produced from a polyol blend comprising a rigid polyol having an OH value of 180–400. This provides drawbacks. The first problem is that this rigid polyol is usually all PO, thus with only secondary hydroxy groups, and thus less reactive. The second drawback is that this rigid polyol leads to highly crosslinked foams, thus with lower mechanical properties (i.e. tear strength and elongation are quite low). The third drawback is that the flow quality is poor (due to an early network formation). See e.g. U.S. Pat. No. 4,839,397; U.S. Pat. No. 5,847,014; and WO-A-9816567.

Co-pending application PCT/EP00/09732 aims at solving these problems and at providing easy processable visco-elastic foams without resort to hard polyol by using the below described polyols b1, b2, b3 and b4. The visco-elastic foams obtained in this way show a relatively low relaxation factor. Surprisingly, it has been found that the relaxation factor can be improved by using a monool in such process.

While the use of monools is known in the prior art, nothing in the prior art discloses or suggests how to increase the relaxation factor of visco-elastic foams using such monools. See e.g. EP 913414; WO96/06874; WO01/57104; and EP386974.

The instant invention also aims at providing a flexible polyurethane foam which exhibits a low compression set, a very low resilience (good damping), a good tear strength, a very high elongation, a high loss factor and a soft feel.

The instant invention also aims at providing a system of wide range of processability (wide range of 2, 4'/4, 4' ratio for MDI), of low viscosity for the ingredient streams (which would be especially useful for making mouldings for sound insulation, and which could be used on state-of-the-art polyurethane machinery).

SUMMARY OF THE INVENTION

The invention thus provides a process for preparing a visco-elastic polyurethane foam at an NCO index of 70–120 by reacting:

a) a polyisocyanate composition;

b1) a polyoxyethylene-polyoxypropylene polyol, having an average nominal hydroxy functionality of 2–6, where the EO is present as tipped EO and/or random EO, the total EO content being at least 50% by weight;

b2) a polyoxyethylene-polyoxypropylene polyol, having an average nominal hydroxy functionality of 2–6, where the EO is present as random EO and/or tipped EO, the total EO content being between 20 and 50% by weight, having a primary hydroxy content of at least 50% calculated on the amount of primary and secondary hydroxyl groups;

b3) a polyoxyethylene-polyoxypropylene polyol, having an average nominal hydroxyl functionality of 2–6, having a primary hydroxy content of at least 50% calculated on the amount of primary and secondary hydroxyl groups, and having an EO content of from 10 to 20% by weight;

b4) a polyoxyalkyleneglycol having an average molecular weight from 100 to 1200;

b5) a polyoxyalkylene monool having a molecular weight of at least 120;

these compounds b1, b2, b3, b4 and b5 being reacted according to the following proportions, based on the combined weights of b1, b2, b3, b4 and b5: b1: 30–85 wt %, b2: 5–50 wt %, b3: 2–30 wt %, b4: 0–50 wt %, b5: 1–20 wt %;

c) water; and optionally d) additives and auxiliaries known per se.

The invention also relates to a specific polyol composition comprising the four or five above compounds according to the specified ratios.

DETAILED DESCRIPTION OF THE INVENTION

In the context of the present invention the following terms, if and whenever they are used, have the following meaning:

1) isocyanate index or NCO index:

the ratio of NCO-groups over isocyanate-reactive hydrogen atoms present in a formulation, given as a percentage:

$$\frac{[NCO] \times 100}{[\text{active hydrogen}]} (\%)$$

In other words, the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines, monools and/or water; this means that for the purpose of calculating the isocyanate index at the actual foaming process one hydroxyl group is considered to comprise one reactive hydrogen, one primary or secondary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the average functionality (number of hydroxyl groups per molecule) of a monool or polyol on the assumption that this is the average functionality (number of active hydrogen atoms per molecule) of the initiator(s) used in their preparation although in practice it will often be somewhat less because of some terminal unsaturation. The average equivalent weight of a polyol is the average molecular weight divided by this average nominal hydroxyl functionality.

6) The term "average" is used to indicate an average by number.

7) The term "visco-elastic foams" are intended to designate those foams having a resilience of at most 40%, as measured according to ISO 8307.

The invention provides a process for preparing a visco-elastic polyurethane foam at an NCO index of 70–120 by reacting:

a) a polyisocyanate composition;

b1) a polyoxyethylene-polyoxypropylene polyol, having an average nominal hydroxy functionality of 2–6, where the EO is present as tipped EO and/or random EO, the total EO content being at least 50% by weight;

b2) a polyoxyethylene-polyoxypropylene polyol, having an average nominal hydroxy functionality of 2–6, where the EO is present as random EO and/or tipped EO, the total EO content being between 20 and 50% by weight, having a primary hydroxy content of at least 50% calculated on the amount of primary and secondary hydroxyl groups;

b3) a polyoxyethylene-polyoxypropylene polyol, having an average nominal hydroxyl functionality of 2–6, having a primary hydroxy content of at least 50% calculated on the amount of primary and secondary hydroxyl groups, and having an EO content of from 10 to 20% by weight;

b4) a polyoxyalkyleneglycol having an average molecular weight from 100 to 1200;

b5) a polyoxyalkylene monool having a molecular weight of at least 120;

these compounds b1, b2, b3, b4 and b5 being reacted according to the following proportions, based on the combined weights of b1, b2, b3, b4 and b5, b1: 30–85 wt %, b2: 5–50 wt %, b3: 2–30 wt %, b4: 0–50 wt %, b5: 1–20 wt %;

c) water; and optionally e) additives and auxiliaries known per se.

The invention also relates to a specific polyol composition comprising the four or five above compounds according to the specified ratios.

The following way of describing polyols is used in the present application: A PO-EO polyol is a polyol having first a PO block attached to the initiator followed by an EO block. A PO—PO/EO polyol is a polyol having first a PO block and then a block of randomly distributed PO and EO. A PO—PO/EO—EO polyol is a polyol having first a PO block then a block of randomly distributed PO and EO and then a block of EO. A PO-EO polyol is a polyol having first a PO block and then an EO block. In the above descriptions, only one tail of a polyol is described (seen from the initiator); the nominal hydroxy functionality will determine how many of such tails will be present.

The polyisocyanates used in the prepolymer may be selected from aliphatic, cycloaliphatic and aralifatic polyisocyanates, especially diisocyanates, like hexamethylene diisocyanate, isophorone diisocyanate, cyclohexane-1,4-diisocyanate, 4,4'-dicyclohexylmethane diisocyanate and m- and p-tetramethylxylylene diisocyanate, and in particular aromatic polyisocyanates like toluene diisocyanates (TDI), phenylene diisocyanates and most preferably methylene diphenyl isocyanates having an isocyanate functionality of at least two. Methylene diphenyl isocyanates (MDI) are preferred.

The methylene diphenyl isocyanates (MDI) may be selected from pure 4,4'-MDI, isomeric mixtures of 4,4'-MDI and 2,4'-MDI and less than 10% by weight of 2,2'-MDI, crude and polymeric MDI having isocyanate functionalities above 2, and modified variants thereof containing carbodiimide, uretonimine, isocyanurate, urethane, alophanate, urea or biuret groups. Most preferred methylene diphenyl isocyanates are pure 4,4'-MDI and isomeric mixtures of 4,4'-MDI with 2,4'-MDI, optionally containing up to 50% by weight of crude or polymeric MDI and/or uretonimine and/or carbodiimide and/or urethane modified MDI. Mixtures of these preferred methylene diphenyl isocyanates with in particular up to 25% by weight of other polyisocyanates mentioned above, especially TDI, may be used if desired.

The polyisocyanate may contain dispersed urea particles and/or urethane particles prepared in a conventional way, e.g. by adding a minor amount of an isophorone diamine to the polyisocyanate.

The prepolymer is obtained by standard methods known to the skilled man. The NCO value is 5–30% by weight.

Preferred polyisocyanates used in the process comprises at least 80% by weight of 4,4'-MDI (methylene diphenyl isocyanate). The remaining part may comprise isomers thereof, higher functionalities oligomers thereof, variants thereof, or any other isocyanate (such as TDI), as disclosed above.

Polyol b1 is an EO rich polyol. It can be prepared by known methods. It comprises PO and EO, where the EO can be random, tipped, or both. Preferably, the EO is random in majority. The EO content is greater than 50% by weight (over the total oxyalkylene units present).

Polyol b2 can have a structure of the type PO—PO/EO—EO or of the type PO/EO—EO or of the type PO-EO. The total EO content is between 20 and 50% by weight (over the total oxyalkylene units present), preferably from 21 to 45%. Polyol b2 has a primary OH content of at least 50%, preferably at least 70%. In the PO—PO/EO—EO type polyol, the first PO block comprises preferably from 20 to 75% by weight of the PO units. In those polyols b2) comprising both tipped and random EO, the weight ratio tipped EO/random EO preferably is from 1:3 to 3:1. The polyol having a structure of the type PO—PO/EO—EO can notably be produced according to the teaching of U.S. Pat. No. 5,594,097. The polyol having a structure of the type -PO/EO—EO can notably be produced according to the teaching of U.S. Pat. No. 4,559,366. One example of a polyol b2) is one where the tipped EO content is from 10–20% by weight.

Polyol b3 can be prepared by known methods. It has a primary hydroxy content of at least 50%, preferably at least 70%. It can be of various structures (PO—EO, PO/EO, etc.), where the EO can be either random, tipped, or both. The EO content is from 10 to 20% by weight (over the total oxyalkylene units present). A preferred polyol is one where EO is present as tipped EO.

Polyol b4 is optional and is a polyoxyalkyleneglycol such as polyoxyethylene glycol (PEG) or polyoxypropylene glycol (PPG). A preferred polyol is a PEG diol.

The average nominal functionality of polyols b1, b2 and b3 is comprised between 2 and 6, preferably between 2 and 4; the average equivalent weight is generally comprised between 800 and 4000, preferably between 1000 and 3500.

The polyoxyalkylene monool preferably has a molecular weight of 200–5000, more preferably of 200–1000 and most preferably of 200–900. Further, the polyoxyalkylene monool preferably is a polyoxyethylene polyoxypropylene monool comprising at least 20% and preferably at least 50% by weight, based on the weight of the monool, of oxyethylene groups or a polyoxyethylene monool or mixtures thereof. Most preferred monools are polyoxyethylene monools having a molecular weight of 200–900.

The polyols are caused to react in the process according to the following proportions, expressed on the basis of the combined weights of the polyols and the monool:

| b1: | 30–85%, preferably 40–80% by weight |
| b2: | 5–50%, preferably 5–30% by weight |
| b3: | 2–30%, preferably 2–20% by weight |
| b4: | 0–50%, preferably 10–40% by weight. |

Each component b1, b2, b3 and b4 may be comprised of mixtures. Further, monool b5 is most preferably used in an amount of 1–15% by weight.

Dispersed material can also be present. This is known as polymer-modified polyol, and comprise e.g. SAN or PIPA (Poly Isocyanate Poly Addition), or PHP (Polyurea Dispersion).

The polymer-modified polyols which are particularly interesting in accordance with the invention are products obtained by in situ polymerization of styrene and/or acrylonitrile in poly(oxyethylene/oxypropylene)polyols and products obtained by in situ reaction between a polyisocyanate and an amino- or hydroxy-functional compound (such as triethanolamine) in a poly(oxyethylene/oxypropylene) polyol. The solids content (based on the total polyol weight b1+b2+b3+b4) can vary within broad limits, e.g. from 5 to 50%. Particle sizes of the dispersed polymer of less than 50 microns are preferred. Mixtures can be used as well.

The invention also relates to a specific polyol mixture, comprising the three or four polyols together with the monool as defined above, according to the following proportions, expressed on the basis of the combined weights of the polyols:

| b1: | 30–85%, preferably 40–80% by weight |
| b2: | 5–50%, preferably 5–30% by weight |
| b3: | 2–30%, preferably 2–20% by weight |
| b4: | 0–50%, preferably 10–40% by weight |
| b5: | 1–20%, preferably 1–15% by weight. |

Water is used as the blowing agent. Carbon dioxide may be added if needed. It is appropriate to use from 1.0 to 10%, preferably from 1.0 to 5% by weight of water based on the weight of the total polyol+monool component (pre-reacted and not pre-reacted, i.e. the total starting polyol or total starting isocyanate-reactive compounds), where the water can optionally be used in conjunction with carbon dioxide.

Other conventional ingredients (additives and/or auxiliaries) may be used in making the polyurethanes. These include catalysts, for example, tertiary amines and organic tin compounds, surfactants, cross linking or chain extending agents, for example, low molecular weight compounds such as other diols, triols (having a molecular weight below those specified for b1–b3) and diamines, flame proofing agents, for example, halogenated alkyl phosphates, fillers and pigments. Foam stabilizers, for example polysiloxane-polyalkylene oxide block copolymers, may be used to stabilize or regulate the cells of the foam.

The amount of these minor ingredients used will depend on the nature of the product required and may be varied within limits well known to a polyurethane foam technologist.

These components, notably, the polyols b1, b2, b3 and b4 and the monool b5 can be added in any order.

The polyols can be added one after the other, or part by part, in any order (for example, part of b1, then the remainder of b1 together with the all of b2+b3+b4+b5 or all of b2 then all of b1 then all of b3 then all of b4 then all of b5).

The components of the polyurethane forming reaction mixture may be mixed together in any convenient manner, for example by using any of the mixing equipment described in the individual components may be pre-blended so as to reduce the number of component streams requiring to be brought together in the final mixing step. It is often convenient to have a two-stream system whereby one stream comprises the polyisocyanate or polyisocyanate prepolymer and the second stream comprises all the other components of the reaction mixture.

Alternatively, the foams are made according to the so called semi- or quasi-prepolymer process or the prepolymer process wherein part or all of the compounds b1–b5 are pre-reacted with the polyisocyanate and wherein the semi- or quasi-prepolymer or prepolymer is subsequently reacted with water and the remaining part of the compounds b1–b5, if any. Preferably, the NCO value of these polymers is 5–30% by weight.

The visco-elastic foams may be made according to the moulding or, preferably, the slabstock technique. The foams may be prepared by known hot or cold cure moulding processes. The foams may be used in the furniture and automotive industries in seating, cushioning and mattresses, and for sound damping and insulation.

The visco-elastic foams thus obtained have a free rise density comprised between, e.g., 25 and 100 kg/m$^3$. These foams show a resilience at most 35%, preferably at most 25%, more advantageously at most 10%.

The invention provides a reaction system that will enable the foam producer to make the desired foam by reacting the polyisocyanate and polyol compositions. This approach provides a relatively simple way to the customer to make a product from often a variety of chemicals by combining two compositions under appropriate conditions. The polyisocyanate component is either separate or is the prepolymer (if any), while the isocyanate-reactive component comprises the remainder of the polyol. Under the prepolymer embodiment, any combination is foreseen. It covers notably the following possibilities: Part of b1+b2+b3+b4+b5 in the prepolymer, then the remainder of b1+b2+b3+b4+b5 in the isocyanate-reactive composition; Part of b1+b2 but no b3/b4/b5, then the remainder of b1+b2 and all b3/b4/b5; Part of b1+b3+b4 but no b2+b5, then the remainder of b1+b3+b4 and all b2+b5; all of b1, then the all of b2+b3+b4+b5; all of b2, then the all of b1+b3+b4+b5; Part of b1, then the remainder of b1 together with the all of b2+b3+b4+b5; Part of b2, then the remainder of b2 together with the all of b1+b3+b4+b5. In one embodiment, the reaction system comprises A) a prepolymer obtained with all the b1 and B) the remainder of the polyol and the monool and the other reactants, additives and/or auxiliaries.

The process is especially useful when the EO content, based on all polyol and monool (pre-reacted or not), is at least 40%, preferably higher than 50% by weight.

The following examples illustrate the invention without limiting same.

EXAMPLES

Unless otherwise indicated, all parts are given by weight.

| Glossary* | |
|---|---|
| Polyol A | PO/EO, with EO as random. EO content is 75% by weight. Average equivalent weight is about 1333. Functionality is 3, OH value is 42 mg KOH/g. |
| Polyol B | PO/EO-EO, total EO content is 28% by weight. Tip EO content is 15% by weight. Average equivalent weight is about 2000. Functionality is 3, OH value is 28 mg KOH/g. Primary OH content is 85%. |
| Polyol C | PO-EO, with EO as tipped. EO content is 15% by weight. Average equivalent weight is 2000. Functionality is 3, OH value is 28 mg KOH/g. Primary OH content is 81% |
| Polyol D | PEG 200 |
| Isocyanate | A mixture having an NCO-value of 29.8% by weight of 1) 25 parts by weight of a polymeric MDI having an NCO value of 30.7% by weight comprising about 38% by weight of diisocyanate of which about 95% by weight is 4,4'-MDI; 2) 60 parts by weight of MDI comprising 70% by weight of 4,4'-MDI and 30% by weight of 2,2'-and 2,4'-MDI; and 3) 15 parts by weight (pbw) of a prepolymer having an NCO value of 12.9% by weight made by reacting about 27 pbw of MDI (2,2' and 2,4'-MDI = 15% by weight), about 16.5 pbw of above polymeric MDI and about 56.5 pbw of polyol C. |
| D33LV | Catalyst from Air Products |

*all functionalities are nominal functionalities

Monool A: CH3—(O CH2 CH2)$_n$—OH, wherein n is such that the molecular weight is about 350.

Monool B: A monomethylether of a random polyoxyethylene polyoxypropylene diol having a molecular weight of about 600 and the amount of oxyethylene groups being about 70% by weight.

Foams are produced according to the following scheme. Polyols, catalyst, monool and water are mixed prior to the addition of isocyanates. Polyol blends and isocyanates are mixed at 20° C. during 8 seconds before foaming. Free-rise foams are made in plastic buckets of 2.5 l. Amounts are in parts by weight. The properties of the foam are determined according to the following methods and standards:

| | |
|---|---|
| FRD (Free Rise Density), kg/m$^3$ | ISO 845 |
| Compression hardness, CLD 40% (kPa) | ISO 3386-1 |
| Hysteresis Loss (%), (HL) | ISO 3386-1 |
| Compression set (thickness), (CS) (Dry 75% (%) and Humid 75% (%)) | ISO 1856 |
| Resilience (%) | ISO 8307 |
| Tear strength (N/m)(Max) | ISO 8067 |
| Tensile strength(kPa) | ISO 1798 |
| Elongation (%) | ISO 1798 |

Relaxation factor is determined as follows:
Measurement for starting-CLD and Relax-CLD: Based on ISO 3386-1 with modified procedure:
1) The instron-plate goes down at 50 mm/min until a force of 2N (i.e. until the instron-plate touches the foam).
2) Then the instron-plate compresses the foam at a rate of 500 mm/min until a compression of 40%, the compression stress value is immediately noted and taken as starting-CLD.
3) The foam stays compressed at the same compression (40%) for over 3 minutes, then the stress value is noted as relaxed-CLD.

The relaxation factor, %=100×((Starting-CLD)−(Relaxed-CLD))/Starting-CLD.

The foams obtained were visco-elastic foams having a resilience below 10%.

| | Examples | | | | | | |
|---|---|---|---|---|---|---|---|
| Component | 1* | 2* | 3 | 4 | 5* | 6 | 7 |
| Polyol A | 67 | 67 | 67 | 67 | 55 | 50 | 50 |
| Polyol B | 13 | 13 | 13 | 13 | 15 | 15 | 10 |
| PEG 200 | 20 | 20 | 20 | 20 | 30 | 30 | 30 |
| Monool A | — | — | 6 | 6 | — | — | — |
| Monool B | — | — | — | — | — | 5 | 10 |
| Water | 2.5 | 2.5 | 2.5 | 2.5 | 1.4 | 1.4 | 1.4 |
| D33 LV | 0.5 | 0.5 | 0.5 | 0.5 | 0.8 | 0.8 | 0.8 |
| Isocyanate | 65 | 70 | 75 | 80 | 70 | 70 | 70 |
| NCO-index | 85 | 92 | 95 | 102 | 97 | 96 | 95 |
| FRD, kg/m3 | 53 | 52 | 51 | 48 | 80 | 85 | 85 |
| Relaxation factor, % | 26 | 33 | 33 | 48 | — | — | — |
| CLD 40%, kPa | — | — | — | — | 4.3 | 4.2 | 3.3 |
| Starting CLD, kPa | 1.9 | 2.4 | 1.8 | 2.3 | — | — | — |
| HL, % | — | — | — | — | 24 | 27 | 28 |
| CS, dry 75%, % | — | — | — | — | 1.4 | 1.6 | 2.4 |
| CS, wet 75%, % | — | — | — | — | −1.4 | −1.3 | −1.1 |
| Tear max, (N/m) | — | — | — | — | 161 | 194 | 192 |
| Tensile, kPa | — | — | — | — | 82 | 79 | 71 |
| Elongation, % | — | — | — | — | 165 | 173 | 194 |

*Comparative examples

The Examples show that by using the monool a higher relaxation factor is obtained at similar density/hardness; foams are made at a higher index, which reduces the risk of by-product formation.

Further, the compression set is not significantly affected by monool use although J. H. Arceneaux et al, J. Elastomers and Plastics, vol 14, p 63, 1982 state that addition of small amounts of monool increases compression set significantly in conventional systems. Further, tear strength and elongation are improved by the use of monool; the foams are softer and have a better hand feeling.

What is claimed:

1. A process for preparing a visco-elastic polyurethane foam at an NCO index of 70–120 by reacting:
   a) a polyisocyanate composition;
   b1) a polyoxyethylene-polyoxypropylene polyol, having an average equivalent weight between 800 and 4000 and an average nominal hydroxy functionality of 2–6, where the EO is present as random EO and/or tipped EO, the total EO content being at least 50% by weight;
   b2) a polyoxyethylene-polyoxypropylene polyol, having an average equivalent weight between 800 and 4000 and an average nominal hydroxy functionality of 2–6, where the EO is present as tipped EO and/or random EO, the total EO content being between 20 and 50% by weight, having a primary hydroxy content of at least 50% calculated on the amount of primary and secondary hydroxyl groups;
   b3) a polyoxyethylene-polyoxypropylene polyol, having an average equivalent weight between 800 and 4000 and an average nominal hydroxyl functionality of 2–6, having a primary hydroxy content of at least 50% calculated on the amount of primary and secondary hydroxyl groups, and having an EO content of from 10 to 20% by weight;

b4) a polyoxyalkyleneglycol having an average molecular weight from 100 to 1200;

b5) a polyoxyalkylene monool having a molecular weight of at least 120;

these compounds b1, b2, b3, b4 and b5 being reacted according to the following proportions, based on the combined weights of b1, b2, b3, b4 and b5, b1: 30–85 wt %, b2: 5–50 wt %, b3: 2–30 wt %, b4: 0–50 wt %, b5: 1–2 wt %;

c) water; and optionally d) additives and auxiliaries known per se.

2. The process of claim 1, wherein compounds b1, b2, b3, b4 and b5 are reacted according to the following proportions, based on the combined weights of b1, b2, b3, b4 and b5: b1: 40–80 wt %, b2: 5–30 wt %, b3: 2–20 wt %, b4: 10–40 wt % and b5: 1–15 wt %.

3. The process of claim 1, wherein the functionality of the polyols b1, b2 and b3 is 2–4 and the EO content of the polyol and the monool based on the combined weights of b1, b2, b3, b4 and b5 is at least 40% by weight.

4. The process of claim 2, wherein the functionality of the polyols b1, b2 and b3 is 2–4 and the EO content of the polyol and the monool based on the combined weights of b1, b2, b3, b4 and b5 is at least 40% by weight.

5. The process of claim 1, wherein the monool b5 is a polyoxyethylene polyoxypropylene or polyoxyethylene monool having a molecular weight of 200–900.

6. The process of claim 2, wherein the monool b5 is a polyoxyethylene polyoxypropylene or polyoxyethylene monool having a molecular weight of 200–900.

7. The process of claim 3, wherein the monool b5 is a polyoxyethylene polyoxypropylene or polyoxyethylene monool having a molecular weight of 200–900.

8. The process of claim 4, wherein the monool b5 is a polyoxyethylene polyoxypropylene or polyoxyethylene monool having a molecular weight of 200–900.

9. The process of claim 1, wherein the monool b5 is a polyoxyethylene polyoxypropylene monool comprising at least 50% by weight, based on the weight of the monool, of oxyethylene groups or a polyoxyethylene monool or mixtures thereof.

10. The process of claim 2, wherein the monool b5 is a polyoxyethylene polyoxypropylene monool comprising at least 50% by weight, based on the weight of the monool, of oxyethylene groups or a polyoxyethylene monool or mixtures thereof.

11. The process of claim 3, wherein the monool b5 is a polyoxyethylene polyoxypropylene monool comprising at least 50% by weight, based on the weight of the monool, of oxyethylene groups or a polyoxyethylene monool or mixtures thereof.

12. The process of claim 4, wherein the monool b5 is a polyoxyethylene polyoxypropylene monool comprising at least 50% by weight, based on the weight of the monool, of oxyethylene groups or a polyoxyethylene monool or mixtures thereof.

13. The process of claim 5, wherein the monool b5 is a polyoxyethylene polyoxypropylene monool comprising at least 50% by weight, based on the weight of the monool, of oxyethylene groups or a polyoxyethylene monool or mixtures thereof.

14. The process of claim 6, wherein the monool b5 is a polyoxyethylene polyoxypropylene monool comprising at least 50% by weight, based on the weight of the monool, of oxyethylene groups or a polyoxyethylene monool or mixtures thereof.

15. The process of claim 7, wherein the monool b5 is a polyoxyethylene polyoxypropylene monool comprising at least 50% by weight, based on the weight of the monool, of oxyethylene groups or a polyoxyethylene monool or mixtures thereof.

16. The process of claim 8, wherein the monool b5 is a polyoxyethylene polyoxypropylene monool comprising at least 50% by weight, based on the weight of the monool, of oxyethylene groups or a polyoxyethylene monool or mixtures thereof.

17. A polyol composition comprising:

b1) a polyoxyethylene-polyoxypropylene polyol, having an average equivalent weight between 800 and 4000 and an average nominal hydroxy functionality of 2–6, where the EO is present as random EO and/or tipped EO, the total EO content being at least 50% by weight;

b2) a polyoxyethylene-polyoxypropylene polyol, having an average equivalent weight between 800 and 4000 and an average nominal hydroxy functionality of 2–6, where the EO is present as tipped EO and/or random EO, the total EO content being between 20 and 50% by weight, having a primary hydroxy content of at least 50% calculated on the amount of primary and secondary hydroxyl groups;

b3) a polyoxyethylene-polyoxypropylene polyol, having an average equivalent weight between 800 and 4000 and an average nominal hydroxyl functionality of 2–6, having a primary hydroxy content of at least 50% calculated on the amount of primary and secondary hydroxyl groups and having an EO content of from 10 to 20% by weight;

b4) a polyoxyalkyleneglycol having an average molecular weight from 100 to 1200;

b5) a polyoxyalkylene monool having a molecular weight of at least 120;

these compounds b1, b2, b3, b4 and b5 being present according to the following proportions, based on the combined weights of b1, b2, b3, b4 and b5, b1: 30–85 wt %, b2: 5–50 wt %, b3: 2–3 wt %, b4: 0–50 wt %, b5: 1–20 wt %.

18. The polyol composition of claim 17, wherein polyols b1, b2, b3, b4 and b5 are present according to the following proportions, based on the combined weights of b1, b2, b3, b4and b5: b1: 40–80 wt %, b2: 5–3 wt %, b3: 2–20 wt %, b4: 10–40 wt %, b5: 1–15 wt %.

19. The polyol composition of claim 17, wherein the EO content based on the combined weights of b1, b2, b3, b4 and b5 is at least 40% by weight.

20. The polyol composition of claim 18, wherein the EO content based on the combined weights of b1, b2, b3, b4 and b5 is at least 40% by weight.

21. The polyol composition of claim 17, wherein the monool b5 is a polyoxyethylene polyoxypropylene or polyoxyethylene monool having a molecular weight of 200–900.

22. The polyol composition of claim 18, wherein the monool b5 is a polyoxyethylene polyoxypropylene or polyoxyethylene monool having a molecular weight of 200–900.

23. The polyol composition of claim 19, wherein the monool b5 is a polyoxyethylene polyoxypropylene or polyoxyethylene monool having a molecular weight of 200–900.

24. The polyol composition of claim 20, wherein the monool b5 is a polyoxyethylene polyoxypropylene or polyoxyethylene monool having a molecular weight of 200–900.

25. The polyol composition of claim 17, wherein the monool b5 is a polyoxyethylene polyoxypropylene monool comprising at least 50% by weight, based on the weight of the monool, of oxyethylene groups or a polyoxyethylene monool or mixtures thereof.

26. The polyol composition of claim 18, wherein the monool b5 is a polyoxyethylene polyoxypropylene monool comprising at least 50% by weight, based on the weight of the monool, of oxyethylene groups or a polyoxyethylene monool or mixtures thereof.

27. The polyol composition of claim 19, wherein the monool b5 is a polyoxyethylene polyoxypropylene monool comprising at least 50% by weight, based on the weight of the monool, of oxyethylene groups or a polyoxyethylene monool or mixtures thereof.

28. The polyol composition of claim 21, wherein the monool b5 is a polyoxyethylene polyoxypropylene monool comprising at least 50% by weight, based on the weight of the monool, of oxyethylene groups or a polyoxyethylene monool or mixtures thereof.

* * * * *